US006740417B1

(12) United States Patent
Sievers et al.

(10) Patent No.: US 6,740,417 B1
(45) Date of Patent: May 25, 2004

(54) SURFACE-TREATED MATERIALS AND METHOD FOR MAKING THEM

(75) Inventors: Thomas Sievers, Dr. Lilo-Gloden-Str. 2, D-21337 Luneburg (DE); Herbert Fahrenkrog, Solingen (DE)

(73) Assignee: Thomas Sievers, Luneburg (DE)

( * ) Notice: Subject to any disclaimer, the term of this patent is extended or adjusted under 35 U.S.C. 154(b) by 0 days.

(21) Appl. No.: 09/787,688

(22) PCT Filed: Sep. 17, 1999

(86) PCT No.: PCT/DE99/02966
§ 371 (c)(1),
(2), (4) Date: Feb. 1, 2002

(87) PCT Pub. No.: WO00/17129

PCT Pub. Date: Mar. 30, 2000

(30) Foreign Application Priority Data

Sep. 22, 1998 (DE) .......................................... 198 43 498

(51) Int. Cl.⁷ ................................................. B32B 9/04
(52) U.S. Cl. ........................ 428/447; 428/454; 427/554; 427/555; 427/387; 125/1; 125/38
(58) Field of Search ................................ 428/447, 454; 427/554, 555, 387; 125/1, 38; 219/121.6, 121.63, 121.64; 404/19

(56) References Cited

U.S. PATENT DOCUMENTS 3,819,400 A    6/1974   Plankl et al.
4,855,334 A *  8/1989   Maruyama et al. ........... 522/96
6,167,879 B1   1/2001   Sievers et al.

FOREIGN PATENT DOCUMENTS

| AU | 736378 | 11/1998 |
| CA | 2221497 | 11/1996 |
| CA | 2.225.193 | 6/1998 |
| JP | 10-061258 | * 3/1998 |
| WO | WO 97/48536 | 12/1997 |
| WO | WO 98/46405 | 10/1998 |
| WO | WO 99/27011 | 6/1999 |

OTHER PUBLICATIONS

Wacker GmbH data sheets regarding BSâ29 waterproofing agent obtained from wacker.com.*

* cited by examiner

Primary Examiner—Robert Dawson
Assistant Examiner—Christopher Keehan
(74) Attorney, Agent, or Firm—Hedman & Costigan, P.C

(57) ABSTRACT

The invention relates to a surface treated mineral material and a process for producing the same by means of laser treatment and water proofing. A preferred planned use of the invention relates to the surface and wall coverings, made of natural and artificial stones for indoor and outdoor areas, optimized, in particular with respect to wear resistance, stain resistance and slip resistance.

17 Claims, 1 Drawing Sheet

SURFACE-TREATED MATERIALS AND METHOD FOR MAKING THEM

Figure 1:
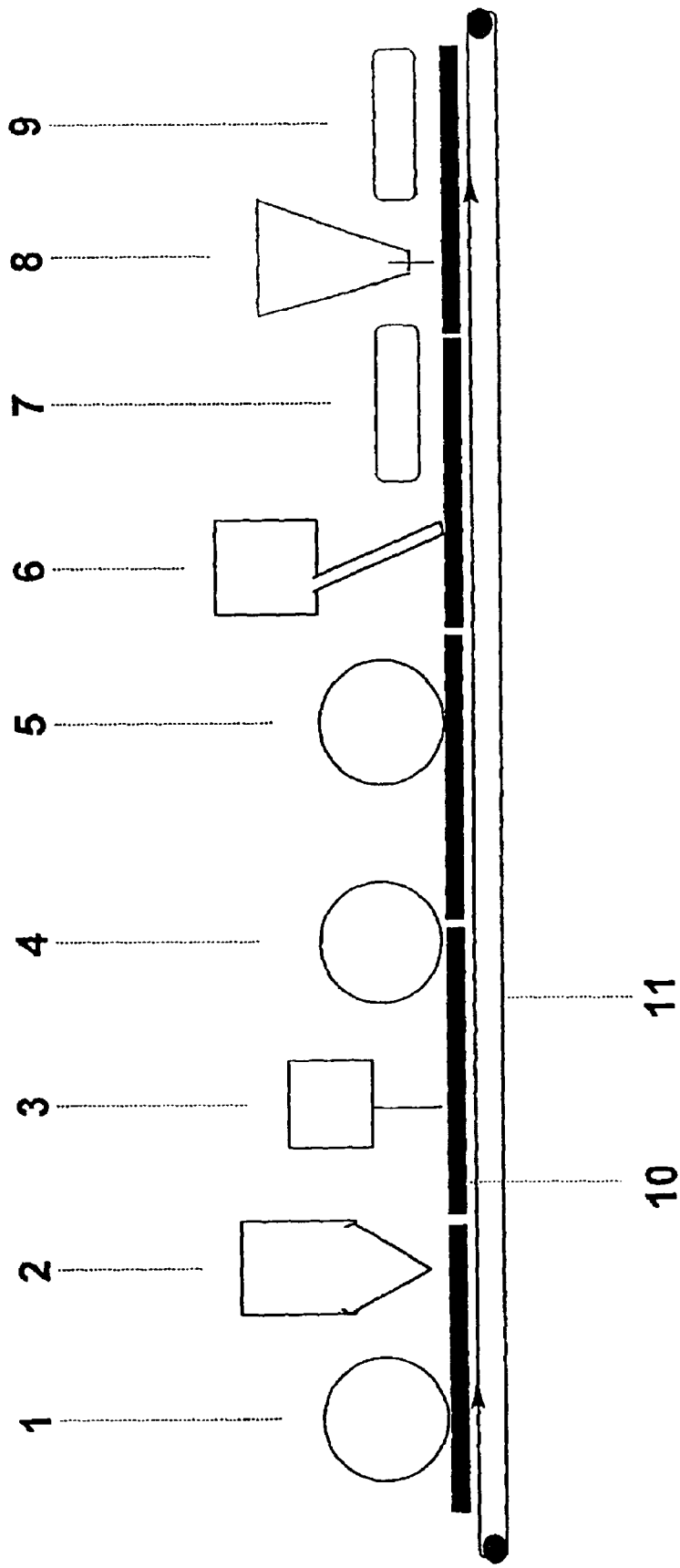

The object of the invention relates to a surface-treated mineral material and a process for their production. A particular planned use of the invention relates to surface optimized floor and wall coverings made from natural or artificial stone for indoor and outdoor areas, in particular optimized with respect to wear resistance, soil repelling and slip resistance.

Slips are one of the most frequent causes of accidents in Germany. The severity of such accidents is usually underestimated. In order to increase the security of footsteps the shoe soles and floors both must be embodied in a slip resistant manner. Predominantly, this is necessary in floor coverings that are exposed to slip enhancing media. In many areas of public life, e.g., on side walks and public courts, and, in private areas as well it is common to use blasted, singed, kerneled, layered, smooth, or serrated, polished, and etched floor coverings in dry as well as in wet areas and transitional areas. In addition to their use as floor coverings, such coverings are also used for wall and frontal surfaces, preferably in outdoor regions, but in indoor regions as well. Here, it is desirable to durably maintain the slip resistant effect and, simultaneously, achieve a surface as stain resistant, washable, and wear resistant as possible, that is embodied with steam permeable, hydrophobic, and oleophobic features.

Frequently, indoor and outdoor floor and wall areas are covered with natural and artificial stone. A variety of regulations must be observed in relation to security of footsteps. Thus, in many areas only heavily structured surfaces can be used. Such surfaces have production-related disadvantages.

The evaluation of surfaces can be performed, e.g., according to the following standardized processes:
DIN 51130, the determination of the slip resistant characteristics for work places and work areas exposed to danger of slipping,
DIN 51097, the determination of the slip resistant characteristics for wet loaded bare foot areas —stepping processes,
ASTM 1028, static coefficient of friction or
ISO 10.545 part 17 (Method B: Static Slider).

A variety of processes exist for the production and/or increase of slip resistant characteristics of floor coverings and for the production of various surface appearances and surface characteristics as well. Predominantly, their utilization depends on where and how the surface is to be used and what the builder requests with regard to surface appearance and surface characteristics. In the following, the most essential processes are briefly described:

1. Blasting

In blasting a blasting material corresponding to a desired roughness is thrown with high pressure onto the surface. The more or less hard blasting material causes an uneven roughness provided-with micro roughness and deadening of the surface. Additionally, production related fine dust particles adhere more or less durably to the stone surface in or at the joint mixtures.

2. Flame Jet Singeing

In flame jet singeing highly energetic fuel gas —oxygen flames are created by which the surfaces to be treated are briefly heated to a large extent. Due to the effect of the flames, the quartz crystals in the uppermost regions of the stone burst and parts of the stone melt; subsequently it solidifies in a glasslike manner, adheres comparatively loosely to the surface, and peels off when used.

3. Kerneling

Kerneling occurs by using a kerneling tool (kerneling hammer) which is provided with several, evenly positioned chisel tips. During the continuous motion of a work piece the kerneling hammer impacts the surface with a certain frequency. This results in a more or less intense shock of the composition with chippings and loosely or tighter adhering stone parts, dependent on the stone components. Production related superfine dust particles adhere more or less tightly in or to the composition mixtures.

4. Surface Coating

The coating of surfaces can be performed such that the surfaces are provided with, e.g., knobs and, thus, an increase in slip resistance is achieved. The stone is closed over its entire surface. This is disadvantageous after laying, since the water used for laying is blocked and the stone is damaged by rising water (steam pressure develops, e.g., which can burst the stone). The modification of the appearance characteristics is correlated to the coating used; this method is only of limited use in floor coverings, since wear cannot be prevented.

5. Rough Charging

In ore processing (blocks of natural or artificial stone), iron saw blades cut the blocks into rough slabs with a steel-sand mixture being added. Thus resulting in an unevenly rough surface. Production related fine dust and residue of the steel-sand mixture adhere in or at the stone surface. Depending on the type of stone and the present residue, corrosion processes begin when coming into contact with water, which can partially result in bursting of the composition and discoloration depending on the duration of the exposure.

6. Serrating

In ore processing (blocks of natural or artificial stone), iron saw blades cut the blocks are cut by means of diamond-stocked metal saw blades directly into standard size. Thus, resulting in a surface comparable to coarse polishing. The quickly rotating cutting disc and the continuous introduction of water press the production related fine dust particles into the natural formation of the stone surface. These fine dust particles partially adhere tightly to the stone formation; however, they separate from floor coverings when said floor is used.

7. Chemical Etching

Generally, in chemical etching of stone surfaces (using substances containing hydrofluoric acid) the soft parts are washed out first. The chemical composition and concentration must be adjusted to the stone surface, in order to prevent undesired damage, such as corrosion, for instance. Health hazardous vapors develop during processing.

8. Cutting and/or Polishing

Treatment of the surfaces by means of an abrasive medium, such as diamond dust, boron nitride, or corundum (fused alumina).

The described processes or similar processes using abrasive media and/or chisel-like tools achieve an increase in security of footsteps, however, they also cause structural shocks and chippings off the formation and, production related superfine dust particles deposit, partially adhering tightly. In some processes, it is also disadvantageous that the slip resistance is only achieved subsequent a post treatment at the point of use.

From DE A 2 053 110 a process for treating mineral surfaces is known with the surface initially being hydromechanically and subsequently treated with organo-silicide compositions causing hydrophobic effects. However, surfaces treated in such a way are not provided with the desired stain resistance.

From DE 195 18 270 a surface treated, slip resistant floor covering is known that does not show some of the above-mentioned disadvantages. Such a floor covering is produced by applying statistically distributed micro craters, invisible for the human eye, onto the surface of the floor covering by means of a laser.

The object of the invention is to provide highly slip resistant, stain resistant, and durable, wear resistant, weather resistant, free of fine dust, and optionally, refined surfaces, e.g., by means of polishing, made from mineral materials which are not provided with any of the disadvantages of prior art.

The object is attained according to the invention by providing a process, having at least two steps, for treating the surface of mineral materials, which comprises the following steps:

a) Laser radiation affecting the surface and b) Application of an organo-silicide composition onto the surface.

The object of the surface treatment are mineral materials such as: natural stones, artificial stones, e.g., mineral agglomerates of resin compositions or cement compositions, ceramics or ceramic materials, earthen ware, or stone ware. The above-mentioned steps are preferably parts of a treatment process, essentially limited in duration, and occur prior to further treatment/utilization as a mineral material/construction material.

The object of the process according to the invention can be untreated or pretreated mineral materials. Part of the pretreatment of the surface can be a surface treatment by means of blasting, singing, kerneling, coating, rough charging, sawing, cutting, and/or etching, as mentioned above. Furthermore, prior to one of the above-mentioned steps (a) and (b) according to the invention, the surfaces are advantageously cleared of loosely adhering particles by means of a mechanical surface cleaning, such as brushing, washing or blowing.

Work pieces treated this way, if necessary, are exposed to the laser treatment of step (a) in the following described in detail.

Step (a): Laser Treatment

According to the invention, a removal of loose particles from the surface and a "welding" or glazing of existing micro fractures performed by the effect of laser radiation, in particular, laser impulses. Thus, a surface is achieved that can accept the preferably subsequent waterproofing.

Essential parameters of the laser treatment are:

diameter of the treatment area, i.e., lateral extension of the laser induced surface indentation, pulse duration (duration of impact) and pulse energy, i.e., depth of the laser induced surface indentation and, corresponding to the wave length of the laser, the type of interaction, i.e., evaporation/melting and the distance of the impact areas, e.g., number and distribution of laser induced surface indentations.

Shape, depth, and width of the laser induced surface indentations are preferably adjusted such that a shallow indentation develops in the shape of a lens. The indentation in the shape of a lens according to the invention is an indentation whose maximum depth does not exceed half of the average lateral extension of the deepest point of the indentation.

These parameters can be controlled and adjusted to each material and the preferably subsequently performed step of the surface treatment using an organo-silicide composition for controlling the absorbability of the surface of the mineral material. The above-mentioned parameters should be adjusted preferably such that the removal of material is essentially distributed evenly over the surface to be treated and occur essentially by means of evaporation. Consider the material characteristics, it should be practically achieved to introduce a high amount of energy in a very short period of time. In case of treatment of mineral surface made from natural stone (e.g., granite) the pulse energy has a value of preferably 0.4 mJ to 1.5 mJ, a pulse duration of preferably 30 ns to 400 ns.

The laser radiation can be created with the aid of x-ray lasers, solid-matter lasers such as Nd-YAG-lasers or HD-lasers, fluid lasers, or gas lasers, such as $CO_2$-lasers. Preferably, pulsed lasers are used.

Preferably, lens-shaped surface indentations are created by a purposeful effect of impulse laser beams according to the invention. Production related existing structural fractures are smoothened or welded within milliseconds by the effect of punctual heating of micro areas covering the entire surface and loosely or tightly adhering superfine dust particles are evaporated. Depending on the material of the floor covering, the laser parameters, such as energy density, pulse duration, etc., are preferably selected such that the removal of material for creating the surface indentations, the surface smoothening, the welding of stone compositions, and the evaporation of superfine dust particles occur essentially by evaporation.

The deflection of the laser beam over the surface occurs by mean s of design components known per se, such as, e.g., the ones known from their use for labeling or for surface inspections (scanners and polygonal reflectors in connection with plane field optics).

Contrary to the processes of singeing, kerneling, rough charging, and blasting super fine laser structuring concerns a touchless process (further processing) of the surface. The process according to the invention eliminates the results of mechanical construction shocks. The adhesion of super fine dust particles and production related more or less loose stone compositions are evaporated by the laser treatment or chipped off so that an absorbable surface is created for the, preferably subsequent, surface treatment with organo-silicide compositions. Furthermore, the processing step of the laser treatment is characterized in a good controllability of the parameters, i.e., density, depth, and diameter of the micro pores, welding, and smoothening of the surface can be adjusted by the computer controlled use of laser parameters according to the respective requirements of the various surfaces and stones.

The slip resistant feature of the, e.g., previously blasted, singed, kerneled, layered, rough charged or serrated, polished and/or etched surface is not negatively influenced by the laser treatment, but generally enhanced. The national and international standards for slip resistant surfaces are achieved and/or exceeded. Certainly, a destruction of the macroscopic surface of stones can be excluded. This is achieved by statistically unevenly distributed indentations (micro craters), having a suction effect, being provided on the surface, preferably covering the entire surface and being as flat as possible and being preferably invisible for the human eye. In this case, invisible means that the human eye when seen from a certain distance, due to its resolution behavior does not perceive the surface indentations as such. In optimal lighting conditions, the resolution limit is assumed at approximately one angular minute for viewers of normal sight. Therefore, from a minimal viewing distance of 1.5 m (standing adult man) a crater of a maximal lateral expanse of 0.44 mm is barely visible.

Preferably, the laser induced surface indentations (micro craters) are provided with a diameter of 5–900 Am, in particular preferably 10 to 150 μm, and with a depth of 10 to 400 μm, in particular preferably of 20 to 200 μm. Advantageously, the surface (hypothetically entirely plane surface) contains at least 2.5 million laser induced surface indentations per m$^2$, preferably 3.5–20 million. Laser induced surface indentations per m$^2$. Furthermore, the distance of the surface indentations should not be larger than 10 to 250 μm (determined by the smallest distance of the circumference of two surface indentations). The laser induced surface indentations may overlap as well.

When using non-pulsed lasers, such as C0$_2$-lasers for instance, the surface can be treated with a laser beam of variable diameter without directly creating pores, as well. Such a treatment can be considered a continuous melting process on the surface. Sometimes, a surface treatment of such type does not provide the above-mentioned laser induced surface indentations.

Step (b): Plane Application of an Organo-silicide Composition (Called Water Proofing or Water Proofer in the Following)

Water proofers are organo-silicide compositions or compounds containing such. An organo-silicide composition according to the invention is a composition that is provided with at least one silicon-oxygen-carbon compositions sequence per molecule and/or at least one silicon-carbon composition per molecule. Appropriate organo-silicide compositions are also such containing several silicon atoms of which at least two have an oxygen atom, an oxygen-hydrocarbon-composition, an oxygen-hydrocarbon-oxygen-composition, or a hydrocarbon-composition. Additionally, the organo-silicide composition can carry functional groups as well, such as halogen, in particular hydroxy, chlorine, amino, carboxy, cyano, methacryloxy, epoxy, mercapto, or vinyl groups. Suitable organo-silicide compositions are, among others, alkylsilanole, alkylalkoxysilane, alkoxysilane, oligo- and polysiloxane, and silicone. Additionally, the organosilicide compositions can contain metal atoms as well, such as zirconium, aluminum, or titanium, e.g., in the form of Si—O—M, SiO-Alkylen-O—M, Si-Aldylen-O—compositions (M=A1, Zr, or Ti). Preferably, the organo-silicide composition contains predominantly, in particular, preferably at least 80 atom %, in particular at least 90 atom %, silicone, oxygen, carbon, and hydrogen atoms.

It is particularly advantageous for the water proofers to contain an aqueous dispersion of the organo-silicide composition in water. A dispersing agent can be the object of such compositions as well. However, the organo-silicide composition can be a hydrocarbon medium as well, such as mineral turpentine.

A dispersion of an alkylalkoxysilane and a fluoropolymer in water has proven to be a particularly advantageous water proofer, such as the one distributed by the name of Wacker BS29 (0142200) from the company Wacker Chemie GmbH. Another product called Wacker BS 28 can be used as well, however, it is less well suited.

The advantage of the pretreatment by laser effect consists, among others, in the even absorption of the water proofing caused thereby, since in the initial treatment step, any soiling and deposits are cleared from the surface and the water proofer can penetrate into the natural hollow spaces of the stone structure.

The surface provided with such a water proofing is not or only to a small extent limited in its diffusion of water vapors. Thus, the construction material can continue to "breathe" (diffuse) on its bottom, like in the non-water proofed state. Due to the hydrophobous and oloephobous effect of the water proofing agent the surface is protected from absorbing water and impurities such as grease, oil, paint, coffee, coke, tea, urine, red wine, and acid rain, and/or such soiling can be removed more easily since it can not penetrate into the stone structure.

Additionally, the water proofing subsequent to the laser treatment has the advantage in reference to waterproofing of stone surfaces not pretreated according to step (a), blasted, singed, kerneled, layered, charged, serrated, polished or etched that it can be designed water based. Conventional water proofers, used after laying, are based on mineral turpentine and their use carries threaten health and environment. Without prior laser treatment the water proofer cannot penetrate evenly into the stone structure and adheres to the production related superfine dust and soil residue. When using such surfaces, not previously having been treated by laser effect, loosely adhering fine particles can be separated together with the water proofer. Thus, the water proofing effect is torn and compromised.

The application of the water proofer occurs preferably by means of a dosing device and a plane application of the water proofer/a water proofing composition. According to a preferred embodiment the preferably liquid water proofer/water proofing composition is applied by means of rolls evenly depositing the liquid onto the surface of the mineral material. The water proofer is applied such that an even penetration depth is guaranteed and the deposition of excess amounts on the surface are prevented.

The process can be improved such that subsequently to the laser treatment and the water proofing another process is performed by means of thermal heat, microwave treatment, UV —or IR-radiation, or laser treatment, either resulting in recrystallization of the surface due to mild temperatures or a fusion of the organo-silicide composition with the carrier material at high temperatures. According to a preferred embodiment of the invention, the temperature limit on the surface of the mineral material of, e.g., 75 ° C. should preferably not be exceeded.

According to another embodiment of the invention, the stone surface is exposed to a hydro mechanical post processing according to DE 197 15 937 subsequent to the laser treatment and prior to the waterproofing. Here, a preferably acrid cleaning solution is applied onto the surface of the mineral material, preferably by means of the effect of a device for mechanical surface cleaning, such as a brush. Furthermore, preferably after said cleaning solution has affected the surface the cleaning solution is removed/rinsed off and/or neutralized by means of another cleaning solution to be applied.

Furthermore, it is advantageous to heat the surface prior to applying the water proofer. This processing step prepares the surface for the application of the water proofer. The heating of the surface can be performed such that selectively determined regions of the surface, i.e., punctual or area sections and/or particularly certain layers of the surface are heated (e.g., above 25° C. or above 35 ° C.)

According to another embodiment of the invention, before, after, or preferably simultaneously with the water proofing step or in the water proofing composition respectively a color changing, color intensifying addition can be applied onto the surface, such as a brightener, a color pigment, or a soluble dye. This addition can sometimes be chemically attached to the water proofer.

The surfaces produced according to the invention are characterized, e.g., in a reduced absorption capacity for water. Preferably, at least 50 % less water is absorbed by surfaces processed according to the invention in reference to an untreated surface (i.e., a surface prior to being exposed to the process according to the invention).

The process according to the invention comprises a flexible, environmentally friendly process for producing surfaces covering, meeting requests and suiting demands, comprising advantages in relation to conventional surfaces with regard to wear resistance, stain resistance, water absorption, absence of micro fractures, and slip resistance. An important advantage of the process according to the invention is its problem-free integration into the production process of the coverings. Compared to an unprocessed mineral surface the following characteristics are improved: wear resistance, stain resistance, surface compacting, and micro fractures are smoothened/bonded.

Therefore, the mineral material provides laser induced surface indentations and a laser induced smoothening of the surface with a laser induced surface removal occurring in the shape of "lines" in case a non-pulsed laser is used, however, no point-shaped surface indentations are created. The organo-silicide composition can be verified on the surface of the mineral material, particularly in the pore areas near the surface of the mineral material, sometimes even up to a depth of 0.5 to 1 cm, depending on the stone. In a post treatment of the water proofer using higher energy a reaction product of the organo-silicide composition can be proven with the surface of the mineral material an d/or a thermal decomposition product.

Since the water proofer penetrates the stone structure and does not adheres to loose particles, which wear off and separate during utilization the surface of the mineral material provides a visually even appearance even after continuous use. This means that in the case of floor coverings the architect or builder can examine the characteristics of, e.g., a floor covering of natural stone prior to laying, and a subsequent processing and, thus the visual change of the floor connected therewith is unnecessary or, in most cases, even impossible.

In the following, a processing progress is described with reference to FIG. 1.

1 A brush for removal of dry impurities. Brushing direction preferably opposite the belt direction.
2 A laser unit
3 A dosing, station for cleaning solution containing tensides, acids and/or bases
4 A brush cleaning station subsequent to the application of the cleaning solution. Brushing direction preferably opposite to the belt direction, if necessary, subsequent to the brush cleaning station 4, additional dosing stations for cleaning solution and brush cleaning stations may follow (not shown)
5 A brush cleaning station for residue-free removal of adhering and/or in the previous stations diluted components. Brushing direction adjustable to the belt travel direction or opposite thereto; speed, type, and shape of the brushes are variable.
6 A suction device for suctioning the diluted components and liquid residue.
7 A drying station, drying by means of micro waves, infrared, hot air, laser treatment, or thermal heat
8 A dosing unit for the water proofer: plane application of the water proofer
9 A drying station, drying by means of micro waves and/or infrared, hot air, laser treatment, or thermal heat, e.g., by means of introducing air
10 A work piece on the conveyor
11 A Conveyor Device

EXEMPLARY EMBODIMENT

Object:

floor covering made of natural stone, slip resistant when affected by slip-enhancing agents according to existing regulations, stains protected, proofed against the absorption of water and oil by a hydrophobic and oleophobic surface, laid in indoor and outdoor areas of train stations.

Realization:

Surface treatment by means of a Nd-YAG-laser, energy denity of 19 $J/cm^2$, pulse duration of 100 ns, focal distance of 300 mm, focusing onto the material surface, relative movement between the laser focus and the work piece occurs preferably by means of a optical deflection in the y-direction and by work piece transportation in the x-direction. 1 impulse per created microcrater each, diameters of created craters in the range from 0.2 to 0.8 mm, distance of the craters in the x- and the y-direction 0.1 mm, created depth 0.05 mm.

Subsequent mechanical cleaning by means of brushing and vacuuming of larger dust particles, washing of the surface by means of rotating brushes with the use of acids and bases, drying, water proofing using the plane application of an aqueous dispersion containing alkylalkoxysilane and fluorpolymer (Wacker BS 29), and final thermal drying.

What is claimed is:

1. A process for surface treatment of mineral materials including a least the following steps
  a) Applying laser radiation onto the surface and
  b) Applying an organo-silicide composition onto the surface, with the above-mentioned steps (a) and (b) being part of a treatment process essentially limited in time and which occur prior to further processing and/or use of said mineral materials.

2. A process according to claim 1, characterized in that by means of the effect of laser radiation laser induced surface indentations are created with an average diameter of 5 to 900 $\mu$m.

3. A process according to claim 1 characterized in that by the effect of laser radiation laser induced indentations are created with an average depth between 10 to 400 $\mu$m.

4. A process according to claim 1, characterized in that by the effect of laser radiation at least 2.5 million surface indentations per $m^2$ are created.

5. A process according to claim 1 characterized in that as an organo-silicide composition alkylsilanole, alkylalkoxysilane, alkoxysilane, oligo and polysiloxane and/or silicone is applied, sometimes having one or several of the following functional groups: hydroxy, halogen, in particular, chlorine, amino, carboxy, cyano, methacryloxy, epoxy, mercapto, or vinyl.

6. A process according to claim 1, characterized that the organo-silicide composition is applied in the form of an aqueous dispersion.

7. A process according to claim 6 characterized in that the organo-silicide composition is applied in the form of an aqueous dispersion containing a dispersing agent.

8. A process according to claim 6 characterized in that the organo-silicide composition is applied in the form of an aqueous dispersion together with a fluorpolymer fluoropolymer.

9. A process according to claim 1, characterized in that subsequently to the application of the organo-silicide composition a surface treatment is performed by means of thermal energy, UV- or IR- radiation, microwaves and/or lasers.

10. A mineral material produced according to the process of claim 1, characterized in that it is provided with
   A) laser induced surface indentations, a laser induced surface removal and/or a laser induced smoothening of the surface and
   B) an organo-silicide composition onto the surface and/or in the pore space of the mineral material near to the surface.

11. A mineral material according to claim 10, characterized in that the laser induced surface indentations are provided with an average depth of 10 to 400 µm.

12. A mineral material according to claim 10 characterized in that the laser induced surface indentations are provided with an average diameter between 5 and 900 µm.

13. A mineral material according to claim 10 characterized in that the surface is provided with at least 2.5 million laser induced surface indentations per m².

14. A process according to claim 2, characterized in that by means of the effect of laser radiation laser induced surface indentations are created with an average diameter between 10 to 150 µm.

15. A process according to claim 3, characterized in that by the effect of laser radiation laser induced indentations are created with an average depth between 20 to 200 µm.

16. A mineral material according to claim 11, characterized in that the laser induced surface indentations are provided with an average depth between 20 to 200 µm.

17. A mineral material according to claim 12, characterized in that the laser induced surface indentations are provided with an average diameter between 10 to 150 µm.

* * * * *